(12) United States Patent
Trivisonno et al.

(10) Patent No.: US 11,115,918 B2
(45) Date of Patent: Sep. 7, 2021

(54) DEVICES, SYSTEMS AND METHODS FOR ACCESSING AND PROVIDING NETWORK SLICES IN A MOBILE COMMUNICATION NETWORK

(71) Applicant: Huawei Technologies Co., Ltd., Shenzhen (CN)

(72) Inventors: Riccardo Trivisonno, Munich (DE); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/672,275

(22) Filed: Nov. 1, 2019

(65) Prior Publication Data

US 2020/0120590 A1 Apr. 16, 2020

Related U.S. Application Data

(63) Continuation of application No. PCT/EP2017/060348, filed on May 2, 2017.

(51) Int. Cl.
| | |
|---|---|
| *H04W 48/18* | (2009.01) |
| *H04W 8/06* | (2009.01) |
| *H04W 8/12* | (2009.01) |
| *H04W 60/00* | (2009.01) |

(52) U.S. Cl.
CPC ............ *H04W 48/18* (2013.01); *H04W 8/06* (2013.01); *H04W 8/12* (2013.01); *H04W 60/005* (2013.01)

(58) Field of Classification Search
CPC .......... H04W 8/06; H04W 8/12; H04W 48/18

USPC ......................................................... 370/329
See application file for complete search history.

(56) References Cited

U.S. PATENT DOCUMENTS

| | | | |
|---|---|---|---|
| 2018/0035399 A1* | 2/2018 | Xu ............................ | H04W 8/06 |
| 2018/0199243 A1* | 7/2018 | Bharatia ............ | H04W 36/0079 |
| 2018/0227873 A1* | 8/2018 | Vrzic .................... | H04W 76/27 |

OTHER PUBLICATIONS

3GPP TR 23.799 V14.0.0 23799.e00 Dec. 2016.*
3GPP SA WG2 Meeting #120 S2-171889 Mar. 2017.*
3GPP SA WG2 Mtg #118bis S2-170206 Jan. 2017.*
3GPP SA WG2 Meeting #120 S2-171847 Mar. 2017.*
3GPP SA WG2 Meeting #120 S2-172291 Mar. 2017.*
3GPP SA WG2 Meeting #120 S2-1727119 Mar. 2017.*

(Continued)

*Primary Examiner* — William Nealon
(74) *Attorney, Agent, or Firm* — Leydig, Voit & Mayer, Ltd.

(57) ABSTRACT

The present disclosure relates to a user equipment-configured to use a plurality of communication services of a mobile communication network, wherein the plurality of communication services are provided by a plurality of network slice instances of the mobile communication network and wherein access to the plurality of network slice instances is controlled by a plurality of access and mobility management functions, AMFs, including a first AMF and a second AMF, implemented in the mobile communication network, wherein the user equipment is configured to register to the second AMF for using one or more of the communication services provided by the one or more network slices associated with the second AMF, while being registered to the first AMF for using one or more of the communication services.

19 Claims, 8 Drawing Sheets

(56) References Cited

OTHER PUBLICATIONS

"High level functions description for network slicing," 3GPP TSG SA WG2 Meeting #118bis, Spokane, US, S2-170206, XP051216395, pp. 1-4, 3rd Generation Partnership Project, Valbonne, France (Jan. 16-20, 2017).
"TS 23.501: isolated/dedicated slices," SA WG2 Meeting #120, Busan, South Korea, S2-171889, XP051248034, pp. 1-4, 3rd Generation Partnership Project, Valbonne, France (Mar. 27-31, 2017).
"Updates to the registration procedure," SA WG2 Meeting #120, Busan, Korea, S2-172813, XP051258226, pp. 1-8, 3rd Generation Partnership Project, Valbonne, France (Mar. 27-31, 2017).
"3rd Generation Partnership Project; Technical Specification Group Services and System Aspects; Study on Architecture for Next Generation System (Release 14)," 3GPP TR 23.799, V14.0.0, pp. 1-522, 3rd Generation Partnership Project, Valbonne, France (Dec. 2016).
"23.501: Network Slice Selection enhancements," SA WG2 Meeting #120, Busan, Korea, S2-171784, XP051247523, pp. 1-6, 3rd Generation Partnership Project, Valbonne, France (Mar. 27-31, 2017).
"3rd Generation Partnership Project; Technical Specification Group Services and System Aspects; System Architecture for the 5G System; Stage 2 (Release 15)," 3GPP TS 21501, V0.3.0, pp. 1-97, 3rd Generation Partnership Project, Valbonne, France (Feb. 2017).
"3rd Generation Partnership Project; Technical Specification Group Services and System Aspects; Procedures for the 5G System; Stage 2 (Release 15)," 3GPP TS 23.502, V0.3.0, pp. 1-115, 3rd Generation Partnership Project, Valbonne, France (Mar. 2017).
"Updates to the registration procedure," 3GPP SA WG2 Meeting #120, S2-172711, Busan, Korea, pp. 1-8, 3rd Generation Partnership Project, Valbonne, France (Mar. 27-31, 2017).
"23.501: modified registration procedure for security," 3GPP SA WG2 Meeting #118BIS, Spokane, Washington, S2-170184, pp. 1-10, 3rd Generation Partnership Project, Valbonne, France.

\* cited by examiner

700

701 — Registering a user equipment to a second AMF for using one or more of the communication services provided by one or more network slices associated with the second AMF, while being registered to a first AMF for using one or more of the communication services provided by one or more network slices associated with the first AMF

801 — Registering a user equipment to a second AMF for using one or more of the communication services provided by one or more network slices associated with the second AMF, while the user equipment is registered to a first AMF for using one or more of the communication services provided by one or more network slices associated with the first AMF

Fig. 8

DEVICES, SYSTEMS AND METHODS FOR ACCESSING AND PROVIDING NETWORK SLICES IN A MOBILE COMMUNICATION NETWORK

CROSS-REFERENCE TO RELATED APPLICATIONS

This application is a continuation of International Application No. PCT/EP2017/060348, filed on May 2, 2017, the disclosure of which is hereby incorporated by reference in its entirety.

TECHNICAL FIELD

In general, the present disclosure relates to mobile communication networks. In particular, the present disclosure relates to devices, systems and methods for accessing and providing network slices in a mobile communication network.

BACKGROUND

Network slicing is a key feature for 5th generation 5G systems (5GS), introduced to enable network operators to create customised networks providing optimised solutions for different scenarios, which may demand diverse requirements in terms of supported functionality, performance and isolation (see 3GPP TR 23.799 V14.0.0, Study on Architecture for Next Generation, Release 14). 3GPP SA2 TSG (see 3GPP TS23.501 V0.3.0; System Architecture for the 5G System, Release 15) currently defines a network slice as a complete logical network comprising a set of network functions (NFs) and corresponding resources necessary to provide certain network capabilities and network characteristics. It includes both an access network (AN) and a core network (CN) (in the context of a 5G access network and a 5G core network, usually the abbreviations 5G-AN and 5GC are used). A network slice instance (NSI) is the instantiation of a network slice, i.e., a deployed set of NFs delivering the intended network slice services.

FIG. 1 schematically illustrates a reference 5GS architecture 100 currently specified by 3GPP SA2 TSG, defining 5G-AN NFs, 5GC NFs, and NFs interfaces, wherein, for simplicity, reference is made by way of example to the non-roaming scenario and to the service based interface NFs interconnection model. In particular, the 5GS reference architecture 100 depicted in FIG. 1 shows the 5GC decomposition into a set of NFs. Orthogonal sets of NFs have been defined for the control plane (CP) and the user plane (UP), referred to as CPFs and UPFs, respectively. The CPNFs have been classified as common control network functions (CCNFs) and slice specific control network functions (SCNFs), in order to distinguish between NFs which might be shared among multiple NSIs and those that are NSI-specific.

Moreover, as illustrated in FIG. 1, 5GC and a (R)AN 103 are interconnected via the N2 and N3 interfaces for the control plane (CP) and the user plane (UP), respectively. 5GC is connected to external data networks (DN) via the N6 interface. For simplicity, the reference architecture 100 displays a single (R)AN 103, although 5GC can be connected to multiple (R)ANs. The inclusion of the initial of (R)AN "R" between brackets hints to the possibility of 5GC to be connected to access networks of different nature.

In order to better illustrate the 5G system reference architecture 100, in the following, a definition of NFs according to 3GPP TS23.501 V0.3.0; System Architecture for the 5G System, Release 15, is given.

An access and mobility management function (AMF) 105 in connection with a user equipment (UE) 101 wherein the AMF 105 includes termination of RAN CP interface (N2) and of NAS interface (N1), NAS ciphering and integrity protection, mobility management, lawful interception, access authentication and authorization, security anchoring, security context management.

A session management function (SMF) 107 includes session management, UE IP address allocation and management, UP function selection and control, termination of interfaces towards policy control and charging functions, policy enforcement and QoS, lawful interception, termination of session management related NAS messages, downlink data notification, roaming functionality. SMF is connected to UPF via N4 interface.

An authentication server function (AUSF) provides authentication and authorization functionalities.

A network exposure function (NEF) provides means to securely expose the services and capabilities provided by 3GPP network functions (e.g., to third parties or amongst NFs themselves), collects and stores information on other NFs in the form of structured data using a standardized interface (to be re-exposed by the NEF to other NFs and used for NF-specific optimization purposes).

A network repository function (NRF) maintains the deployed NF Instances information when deploying/updating/removing NF instances, supports service discovery function, receives and handles NF discovery requests from NF instances, provides the information of the discovered NF instances.

A policy control function (PCF) supports unified policy framework to govern network behaviours, and provides policy rules to control plane functions to enforce them.

A unified data management (UDM) supports authentication credential repository and processing function (ARPF), stores the long-term security credentials (used in authentication for AKA) as well as subscription information.

An application function (AF) represents any additional CP function which might be required by specific network slices, potentially provided by third parties.

A user plane function (UPF) can include the following functionalities: anchor point for Intra-/Inter-RAT mobility, external PDU session point of interconnection, packet routing & forwarding, UP QoS handling, packet inspection and policy rule enforcement, lawful interception, traffic accounting and reporting, interaction with external DN for transport of signalling for PDU session authorization/authentication by external DN.

In view of the above definitions, it is worth to notice that the AMF 105 is a CCNF, while the SMF 107 is a SCNF.

As illustrated in FIG. 1, an alternative service based interface (SBI) model among CPNFs is defined. Each CPNF exposes an SBI by which authorized NFs can access the services it provides. SBI provides higher flexibility in the interaction among NFs and allows multiple alternative interconnections among those in order to define slice-tailored architectures.

Moreover, in order to identify NSIs and to implement selection procedures allowing the user equipment (UE) 101 to register to and utilise services provided by NSIs, the single network slice selection assistance information (S-NSSAI) and the network slice selection assistance information (NSSAI) parameters have been defined.

An S-NSSAI identifies a NSI, and it is composed by the slice service type (SST) and slice differentiator (SD) parameters. The SST contains information referring to the expected network behaviours in terms of features and services, while the SD contains complementary information to further identify different NSIs still complying with the indicated slice/service type(s).

The NSSAI is a collection of S-NSSAIs. In particular, an NSSAI, which can have standard values as well as public land mobile network (PLMN) specific values, identifies the CCNFs common to a group of NSIs. Within a group of NSIs identified by an NSSAI, each NSI is uniquely identified by the S-NSSAI parameter. The S-NSSAI parameter allows identifying the SCNFs of each single NSI.

Moreover, in 3GPP TS23.501 V0.3.0; System Architecture for the 5G System (Release 15) and in 3GPP TS23.502 V0.3.0; Procedures for the 5G System (Release 15) it is specified how the UE 101 can register to network slices and obtain services provided by a NSI. In particular, the registration management is used to register or de-register a UE/user with the network, and establish the user context in the network. Furthermore, the connection management is used to establish and release the signalling connection between the UE 101 and the AMF 105.

The UE 101 needs to register with the network to receive services that requires registration. Once registered, and if applicable, the UE 101 updates its registration with the network 100 (see the aforementioned reference 3GPP TS23.502 V0.3.0): periodically, in order to remain reachable (periodic registration update) upon mobility (mobility registration update), or to update its capabilities or re-negotiate protocol parameters.

The registration management procedures are applicable over both 3GPP access and non 3GPP access. Two registration management (RM) states are used in the UE 101 and the AMF 105 that reflect the registration status of the UE 101 in the selected PLMN: RM-DEREGISTERED and RM-REGISTERED.

From the above consideration, it follows that the RM states apply on a PLMN basis.

Also, the aforementioned reference 3GPP TS23.501 V0.3.0 specifies that a single UE can simultaneously be served by one or more network slice instances via a 5G-AN. The AMF instance serving the UE logically belongs to each of the network slice instances serving the UE, i.e. this AMF instance is common to the network slice instances serving a UE.

From the above consideration it follows that, for a given PLMN, a UE generally can only be registered to a single AMF at a time.

In view of the above considerations, it follows that 5GS is not able to support multi slice registration, via single (R)AN or multiple RANs, for multi slice capable devices.

Thus, there is a need for improved devices, systems and methods for accessing and providing network slices in a mobile communication network.

SUMMARY

It is an object of the disclosure to provide improved devices, systems and methods for accessing and providing network slices in a mobile communication network.

The foregoing and other objects are achieved by the subject matter of the independent claims. Further implementation forms are apparent from the dependent claims, the description and the figures.

According to a first aspect, the disclosure relates to a user equipment configured to use a plurality of communication services of a mobile communication network, wherein the plurality of communication services are provided by a plurality of network slice instances of the mobile communication network and wherein access to the plurality of communication services provided by the plurality of network slice instances is controlled by a plurality of access and mobility management functions, AMFs, including a first AMF and a second AMF, implemented in a core network of the mobile communication network, wherein the user equipment is configured to register to the second AMF for using one or more of the communication services provided by the one or more network slices associated with the second AMF, while being registered to the first AMF for using one or more of the communication services provided by the one or more network slices associated with the first AMF.

Thus, an improved user equipment is provided being capable of registering to more than one AMF at a time and accessing the corresponding network slices associated therewith. In other words, the disclosure provides the advantage of enabling the support of multi-slice capable user equipment, in particular allowing the user equipment to register and obtain services by multiple NSIs relating to different AMFs within the same PLMN, either accessing them via a single (R)AN or via multiple RANs.

In a possible implementation form of the user equipment according to the first aspect, the user equipment comprises a processor being configured to be with respect to each of the plurality of AMFs in a first state or a second state, wherein in the first state of the processor the user equipment is registered to a respective AMF and in the second state of the processor the user equipment is de-registered to a respective AMF.

In another possible implementation form of the user equipment according to the first aspect, the user equipment is configured to identify the first AMF by a first identifier and the second AMF by a second identifier.

In another possible implementation form of the user equipment according to the first aspect, the first identifier comprises first network slice selection assistance information NSSAI_1 and the second identifier comprises second network slice selection assistance information NSSAI_2.

In another possible implementation form of the user equipment according to the first aspect, with respect to each of the plurality of AMFs, the first state is a "NSSAI_i-Registered" state and the second state is a "NSSAI_i-De-Registered" state, wherein NSSAI_i denotes the network slice selection assistance information for identifying the respective AMF.

In another possible implementation form of the user equipment according to the first aspect, for each of the plurality of AMFs the respective network slice selection assistance information NSSAI_i comprises one or more single network slice selection assistance information, S-NSSAI, parameters for identifying the one or more network slices associated with the respective AMF.

In another possible implementation form of the user equipment according to the first aspect, the user equipment further comprises a communication interface and wherein the communication interface is configured to send a registration request message to the second AMF, wherein the registration request message comprises an indication that the user equipment is already registered to the first AMF.

In another possible implementation form of the user equipment according to the first aspect, the indication comprises a pre-defined value of a registration type parameter of the registration request message.

In another possible implementation form of the user equipment according to the first aspect, the registration request message further comprises information about the AMFs the user equipment is already registered to.

According to a second aspect, the disclosure relates to a corresponding method of operating a user equipment configured to use a plurality of communication services of a mobile communication network, wherein the plurality of communication services are provided by a plurality of network slice instances of the mobile communication network and wherein access to the plurality of communication services provided by the plurality of network slice instances is controlled by a plurality of Access and Mobility Management functions, AMFs, including a first AMF and a second AMF, implemented in a core network of the mobile communication network, wherein the method comprises the step of registering the user equipment to the second AMF for using one or more of the communication services provided by the one or more network slices associated with the second AMF, while being registered to the first AMF for using one or more of the communication services provided by the one or more network slices associated with the first AMF.

Thus, an improved method of operating a user equipment is provided allowing the user equipment registering to more than one AMF at a given time and accessing the corresponding network slices associated therewith.

According to a third aspect, the disclosure relates to a system providing a plurality of communication services of a mobile communication network for a user equipment, wherein the system comprises a plurality of access and mobility management functions, AMFs, including a first AMF and a second AMF, implemented in a core network of the mobile communication network, wherein the plurality of communication services are provided by a plurality of network slice instances of the mobile communication network and wherein access to the plurality of communication services provided by the plurality of network slice instances is controlled by the plurality of access and mobility management functions, wherein the second AMF is configured to register the user equipment to the second AMF for using one or more of the communication services provided by the one or more network slices associated with the second AMF, while the user equipment is registered to the first AMF for using one or more of the communication services provided by the one or more network slices associated with the first AMF.

In an implementation form of the system according to the third aspect, the second AMF is implemented on one or more network entities of the mobile communication network comprising a processor, wherein the processor is configured to be with respect to the user equipment and each of the plurality of AMFs in a first state or a second state, wherein in the first state of the processor the user equipment is registered to a respective AMF and in the second state of the processor the user equipment is de-registered to a respective AMF.

In another implementation form of the system according to the third aspect, the first AMF is configured to be identified by the user equipment using a first identifier and the second AMF is configured to be identified by the user equipment using a second identifier and wherein the first identifier comprises first network slice selection assistance information NSSAI_1 and the second identifier comprises second network slice selection assistance information NSSAI_2.

In another implementation form of the system according to the third aspect, with respect to the user equipment and each of the plurality of AMFs, the first state is a "NSSAI_i-Registered" state and the second state is a "NSSAI_i-De-Registered" state, wherein NSSAI_i denotes the network slice selection assistance information for identifying the respective AMF.

In another implementation form of the system according to the third aspect, for each of the plurality of AMFs the respective network slice selection, assistance information NSSAI_i comprises one or more single network slice selection assistance information, S-NSSAI, parameters for identifying the one or more network slices associated with the respective AMF.

In another implementation form of the system according to the third aspect, in response to receiving a registration request message from the user equipment, the registration request message comprising information about the first AMF the user equipment is already registered to, the second AMF is configured to obtain identity information about the user equipment from the first AMF.

In another implementation form of the system according to the third aspect, in response to receiving a registration request message from the user equipment, wherein the registration request message comprises information about the first AMF the user equipment is already registered to, the second AMF is configured to send a registration notification message to the first AMF for informing the first AMF that the user equipment is registered with the second AMF as well.

In another implementation form of the system according to the third aspect, the first AMF and the second AMF are implemented in a core network of the mobile communication network, wherein the first AMF is configured to be reached by the user equipment via a first radio access network of the mobile communication network and wherein the second AMF is configured to be reached by the user equipment via a second radio access network of the mobile communication network.

According to a fourth aspect, the disclosure relates to a corresponding method of operating a system providing a plurality of communication services of a mobile communication network for a user equipment, wherein the system comprises a plurality of access and mobility management functions, AMFs, including a first AMF and a second AMF, implemented in a core network of the mobile communication network, wherein the plurality of communication services are provided by a plurality of network slice instances of the mobile communication network and wherein access to the plurality of communication services provided by the plurality of network slice instances is controlled by the plurality of access and mobility management functions, wherein the method comprises the step of registering the user equipment to the second AMF for using one or more of the communication services provided by the one or more network slices associated with the second AMF, while the user equipment is registered to the first AMF for using one or more of the communication services provided by the one or more network slices associated with the first AMF.

According to a fifth aspect, the disclosure relates to a computer program comprising program code for performing the method of the second aspect or the method of the fourth aspect, when executed on a computer or a processor.

The disclosure can be implemented in hardware and/or software.

BRIEF DESCRIPTION OF THE DRAWINGS

Further embodiments of the disclosure will be described with respect to the following figures, wherein:

FIG. 7 shows a schematic diagram illustrating a method for operating a user equipment in a mobile communication network according to an embodiment; and FIG. 8 shows a schematic diagram illustrating a method for operating a system providing a plurality of communication services of a mobile communication network for a user equipment according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
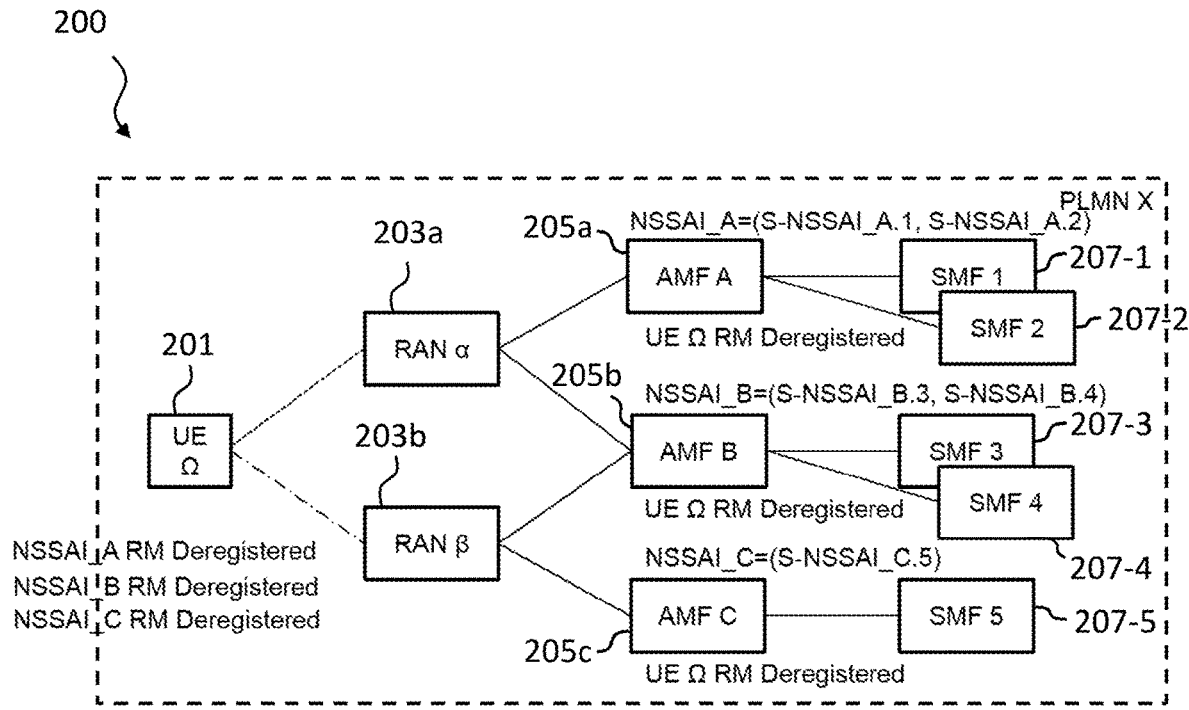
FIG. 2 shows a schematic diagram illustrating a mobile communication network comprising a user equipment according to an embodiment.

FIG. 2 shows a schematic diagram of a mobile (or cellular) communication network 200 comprising a user equipment 201 according to an embodiment. As indicated in FIG. 2, according to an embodiment the mobile communication network 200 can be a public land mobile network (PLMN) provided by a mobile network operator.

The user equipment 201 is configured to use a plurality of communication services of the mobile communication network 200, such as telephony services, data services or other services. The plurality of communication services are provided by a plurality of network slices (also referred to as network slice instances) of the mobile communication network 200.

The respective access to the plurality of communication services provided by the plurality of network slices is controlled by a plurality of access and mobility management functions (AMFs) 205a-c. The plurality of AMFs include, by way of example, a first AMF 205a, a second AMF 205b and a third AMF 205c, which are implemented in a core network of the mobile communication network 200. As will be described in more detail further below, the user equipment 201 is configured to register to the second AMF 205b for using one or more of the communication services provided by the one or more network slices associated with the second AMF 205b, while being registered to the first AMF 205a for using one or more of the communication services provided by the one or more network slices associated with the first AMF 205a.

Figure 1:
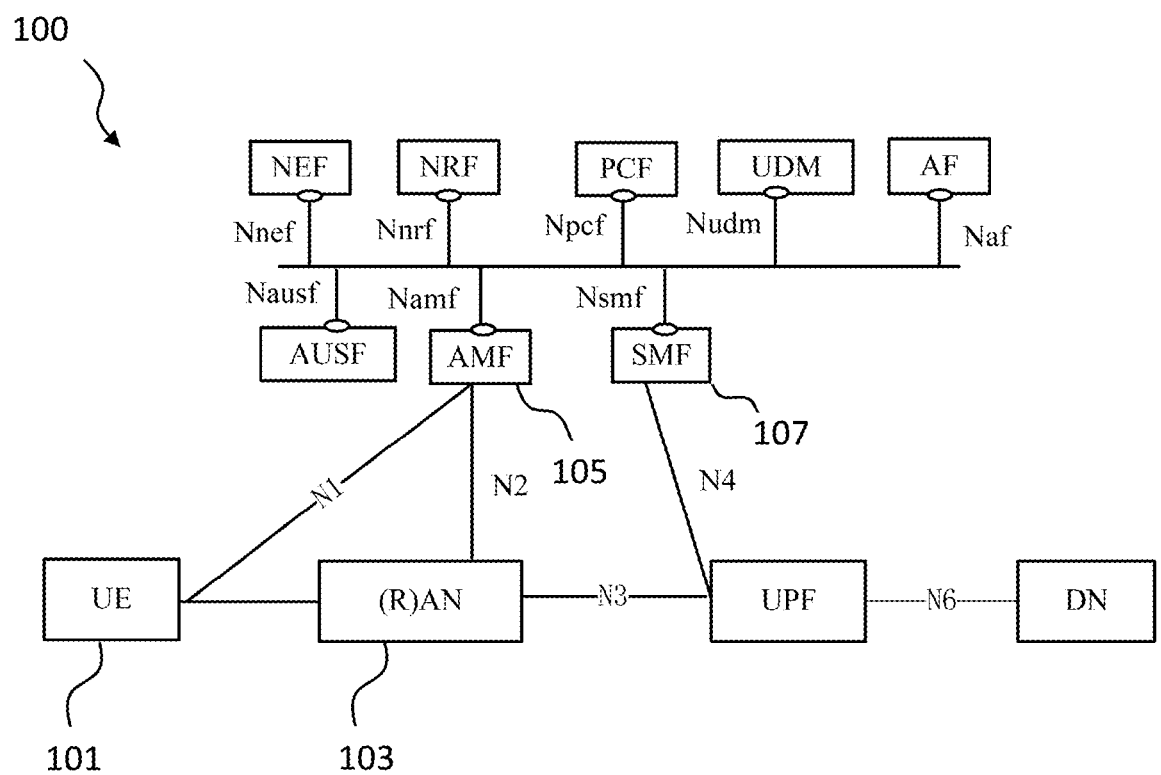
FIG. 1 shows a schematic diagram illustrating a 5G mobile network reference architecture.

In the exemplary embodiment shown in FIG. 2 a first network slice of the plurality of network slices is defined by a combination of a RAN α 203a, the first AMF 205a and a first SMF 207-1. A further network slice associated with the first AMF 205a is defined by a combination of the RAN a 203a, the first AMF 205a and a second SMF 207-2. A third network slice of the plurality of network slices is defined by a combination of the RAN α 203a, the second AMF 205a and a third SMF 207-3. A further network slice associated with the second AMF 205b is defined by a combination of the RAN a 203a, the second AMF 205b and a fourth SMF 207-4. A fifth network slice of the plurality of network slices is defined by a combination of a RAN β 203b, the third AMF 205c and a fifth SMF 207-3. As will be appreciated, the plurality network slices can be accessed by the user equipment via the RAN α 203a and/or the RAN β 203b. Moreover, it will be appreciated that each network slice can comprise in addition or alternatively to the SMFs 207-x shown in FIG. 2 further network functions, for instance, one or more of the network functions shown in FIG. 1. Moreover, it will be appreciated that the mobile communication network shown in FIG. 2 can support further network slices, for instance, a network slice defined by the RAN β 203b, the second AMF 205b and the fourth SMF 207-4.

At least a part of the mobile communication network 200 shown in FIG. 2 can provide a corresponding system providing or comprising the plurality of AMFs 205a-c including the first AMF 205a and the second AMF 205b. In an embodiment, the plurality of AMFs 205a could be implemented on one or more network entities, such as network servers, located in the core network of the mobile communication network 200. The second AMF 205b is configured to process the registration of the user equipment 201 to the second AMF 205b for using one or more of the communication services provided by the one or more network slices associated with the second AMF 205b, while the user equipment 201 is registered to the first AMF 205a for using one or more of the communication services provided by the one or more network slices associated with the first AMF 205a.

In an embodiment of the disclosure, the user equipment 201 comprises a processor being configured to be, with respect to each of the plurality of AMFs 205a-c of the mobile communication network 200, in a first state or a second state, wherein in the first state of the processor the user equipment 201 is registered to a respective AMF and in the second state of the processor the user equipment is de-registered to a respective AMF.

FIGS. 2 to 5 illustrate different registration states of the user equipment 201 with respect to the plurality of AMFs 205a-c.

In an embodiment, two RM (registration management) states can be used in the UE 201 as well as the corresponding AMF 205a-c that reflect the registration status of the UE 201 for a slice selection assistance information (NSSAI) supported in the mobile communication network 200. In an embodiment, the RM state of the UE 201 can be defined on a NSSAI basis. As already described above, the NSSAI is a collection of S-NSSAIs. In particular, an NSSAI, which can have standard values as well as public land mobile network (PLMN) specific values, identifies the CCNFs common to a group of NSIs. Within a group of NSIs identified by an NSSAI, each NSI is uniquely identified by the S-NSSAI parameter. The S-NSSAI parameter allows identifying the SCNFs of each single NSI. An S-NSSAI is composed by the slice service type (SST) and slice differentiator (SD) parameters. The SST contains information referring to the expected network behaviours in terms of features and services, while the SD contains complementary information to further identify different NSIs still complying with the indicated slice/service type(s). Thus, NSSAI identifies all network slices associated with, i.e. controlled by a respective AMF.

In the general case of a mobile communication network 200 with N AMFs, for each i-th configured/accepted NSSAI_i, i=1, 2, . . . , N, the following states can be defined at the UE 201: RM-NSSAI_i-DEREGISTERED and RM-NSSAI_i-REGISTERED. Likewise, for each i-th accepted NSSAI_i, =1, 2, . . . , N, wherein NSSAI_i denotes the network slice selection assistance information for identifying the respective AMF, the following states can be defined for the UE 201 at the respective AMF: RM-NSSAI_i-DEREGISTERED and RM-NSSAI_i-REGISTERED. "Configured NSSAIs" is a term used herein to identify the NSSAI values the UE 201 can use to register to AMFs, such values being known at the UE 201 but not confirmed by the network 200 (e.g. such values can be pre-coded in the UE 201). "Accepted NSSAIs" is a term used herein to identify the NSSAI values the UE 201 can use to register to AMFs, such values being confirmed by the network 200 to the UE 201 as identifying available slices for registration (e.g. such values can be confirmed by the network 200 after a successful registration completes).

In an embodiment, the first identifier can comprise first network slice selection assistance information NSSAI_1 and the second identifier can comprise second network slice selection assistance information NSSAI_2.

In the exemplary embodiment shown in FIG. 2 comprising three AMFs, the UE 201 is de-registered to all network slices and AMFs 205a-c of the mobile communication network 200. However, as illustrated in FIG. 2, according to the disclosure the state of the UE 201 is defined on a NSSAI basis, and not on a PLMN basis.

Figure 3:
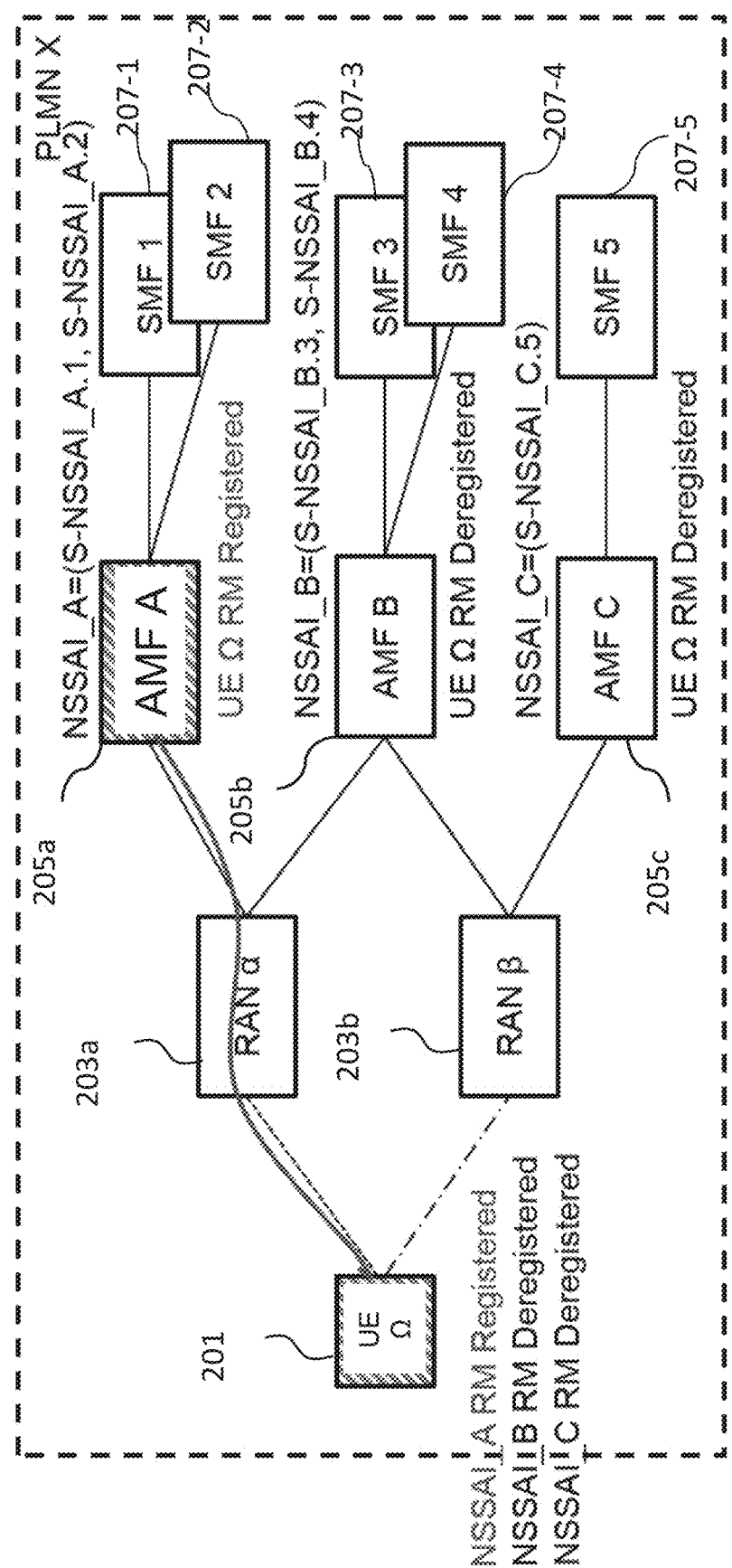
FIG. 3 shows a schematic diagram illustrating a mobile communication network comprising a user equipment according to an embodiment being registered to a first AMF.

In FIG. 3 the UE 201 is registered to NSSAI_A, i.e. the first AMF 205a, of the mobile communication network 200, while still being deregistered to other network slices of the mobile communication network 200 associated with the second AMF 205b or the third AMF 205c.

Figure 4:
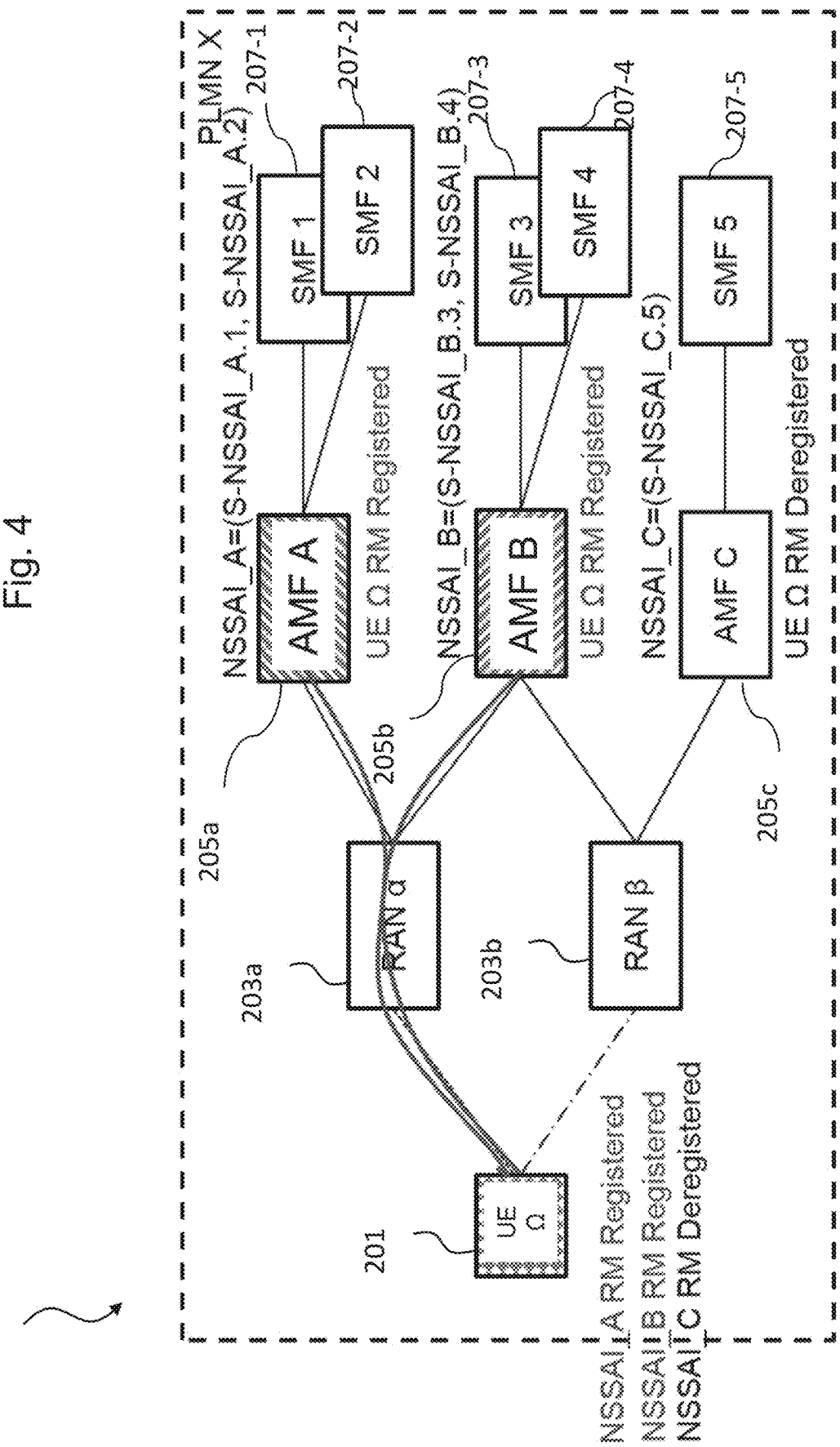
FIG. 4 shows a schematic diagram illustrating a mobile communication network comprising a user equipment according to an embodiment being registered to a first AMF and a second AMF.

In FIG. 4 the UE 201 is registered both to NSSAI_A (i.e. the first AMF 205a) and NSSAI_B (i.e. the second AMF 205b) of the mobile communication network 200 both via RAN_α 203a, while still being deregistered to the other NSSAI_C (i.e. the third AMF 205c).

Figure 5:
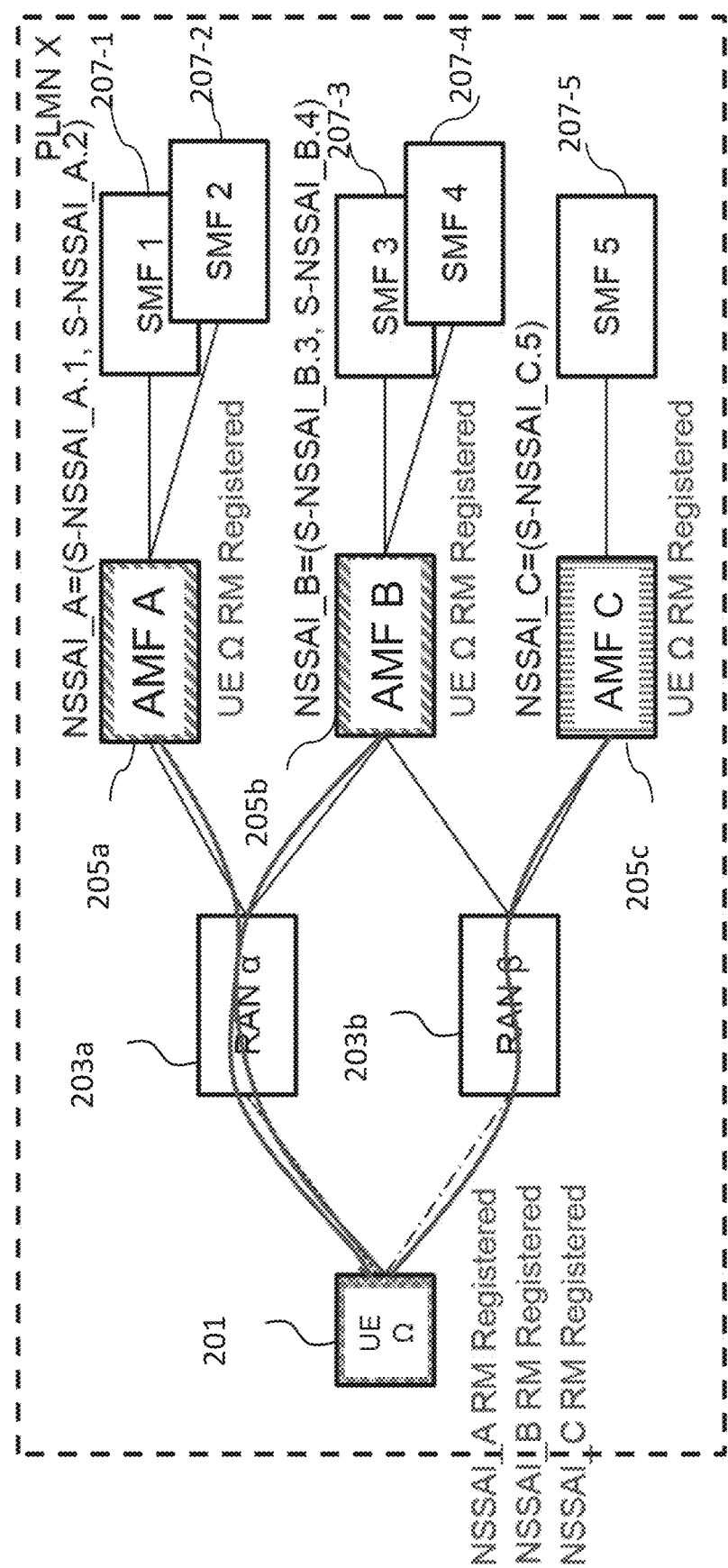
FIG. 5 shows a schematic diagram illustrating a mobile communication network comprising a user equipment according to an embodiment being registered to a first AMF, a second AMF and a third AMF.

Finally, in FIG. 5 the UE 201 is registered to NSSAI_A, NSSAI_B (i.e. the first and second AMF 205a, 205b; via RAN_α 203a) and NSSAI_C (i.e. the third AMF 205c) via RAN_β 203b) of the mobile communication network 200. Thus, in an embodiment, the first AMF 205a, the second AMF 205b and the third AMF 205c are implemented in a core network of the mobile communication network 200, wherein the first AMF 205a and the second AMF 205b are configured to be reached by the user equipment 201 via the first radio access network RAN α 203a of the mobile communication network 200 and wherein the third AMF 205c is configured to be reached by the user equipment 201 via the second radio access network RAN β 203b of the mobile communication network 200. As will be appreciated, in the exemplary embodiment shown in FIG. 5, the second AMF 205b is further configured to be reached by the user equipment 201 via the second radio access network RAN β 203b of the mobile communication network 200 as well.

Figure 6:
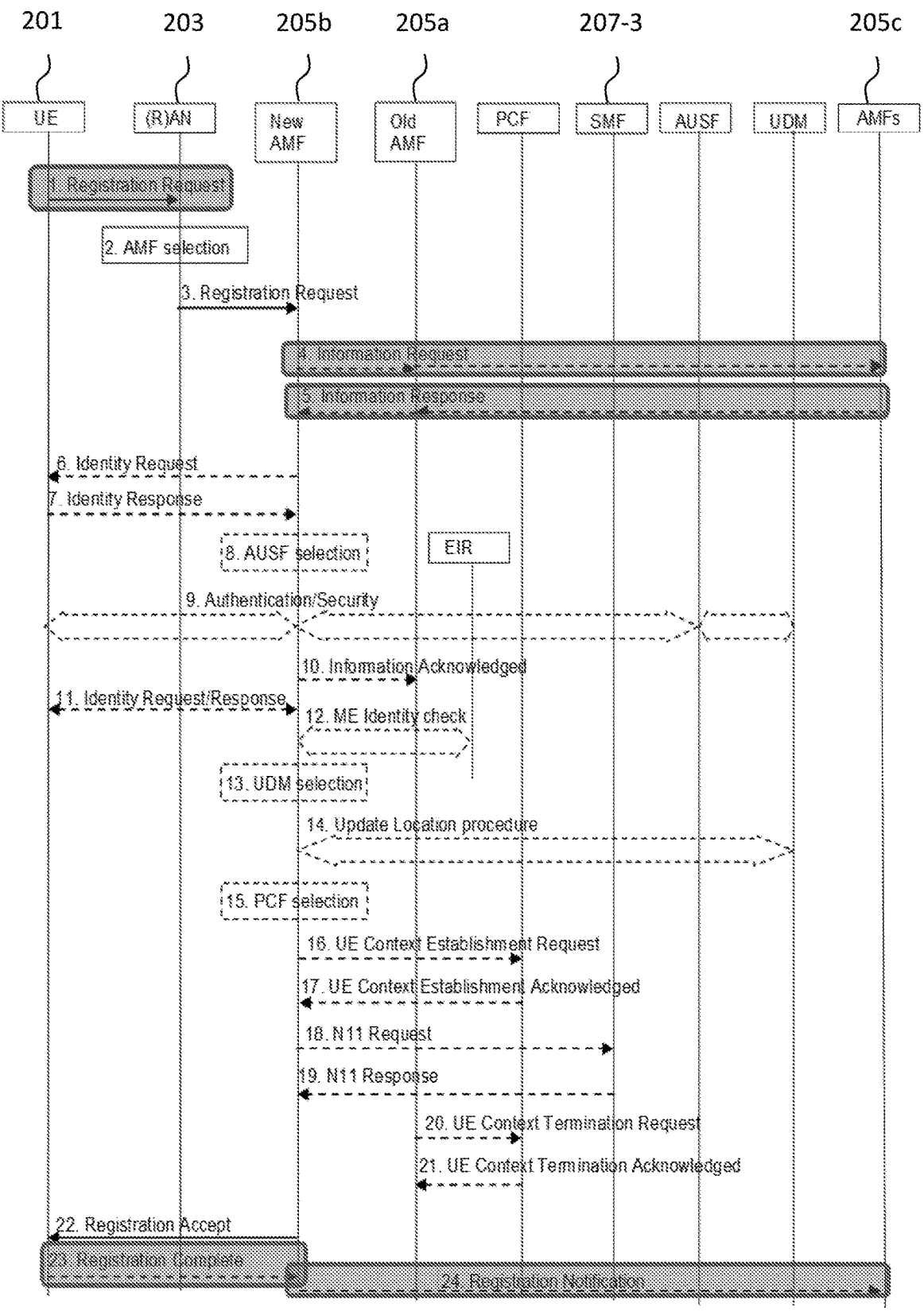
FIG. 6 shows a schematic diagram illustrating a registration procedure of a user equipment in a mobile communication network according to an embodiment.

FIG. 6 shows a schematic diagram illustrating the registration procedure of the user equipment 201 in the mobile communication network 200 according to an embodiment.

The UE 201 can register to the mobile communication network 200 in order to get authorised to receive services, to enable mobility tracking and to enable reachability. The registration procedure can be used, for instance, when the UE 201 wants to perform an initial registration to the 5G system 200, when the UE 201 wants to perform a periodic registration update (due to a predefined time period of inactivity), and, additionally, when the UE 201 wants to update its capabilities or protocol parameters that are negotiated during the registration procedure.

The exemplary registration procedure shown in FIG. 6 comprises the following steps.

1st step: The UE 201 sends to (R)AN 203 an AN message including, e.g., AN parameters and registration request message. The registration request message can include, e.g., a registration type, a subscriber permanent identifier or a temporary user ID, security parameters, NSSAI, UE 5GCN capability, PDU session status. In case of a 5G-RAN 203, the AN parameters include, e.g., SUPI or the temporary user ID, the selected network and NSSAI. The registration type can indicate if the UE 201 wants to perform an "extra registration" (i.e., the UE 201 is already registered to other NSSAIs, e.g., via another (R)AN). If the registration type parameter included in the registration request message is set to "extra registration", the second AMF (also referred to as the new AMF) 205b receiving the registration request message (identified by NSSAI_2) may request and obtain identity information about the UE 201 from AMFs of the network slices the UE 102 is registered to (identified by NSSAI_k, k=1, 2, . . . , M, k≠i), such as the first AMF (also referred to as the old AMF) 205a (identified by NSSAI_1). In particular, the registration type parameter included in the registration request message can be set to an "extra registration" value, when the UE 201 sends the registration request message to register to an NSSAI_i=1, 2, . . . , N, while being already registered to other NSSAI_k, k=1, 2, . . . , M, k≠i for the same PLMN. If the registration type parameter included in the registration request message is set to "extra registration", the registration request message can also include a list of M NSSAI_k the UE 201 is already registered to.

2nd step: If a SUPI is included or the temporary user ID does not indicate a valid AMF, the (R)AN 203, based on (R)AT and NSSAI, if available, selects an AMF, namely the new AMF 205b.

3rd step: The (R)AN 203 sends to the new AMF 205b the N2 message including, e.g., N2 parameters and the registration request. The registration request can include, e.g., the registration type, the subscriber permanent identifier or the temporary user ID, the security parameters, and NSSAI.

4th step: Conditionally, the new AMF 205b can send to the old AMF 205a the information request (complete registration request). If the registration type indicates "extra registration", the information request message may be sent to a further AMF 205c the UE 201 is already registered to.

5th step: Conditionally, the old AMF 205a can send to the new AMF 205b an information response (SUPI, MM context, SMF information).

6th step: Conditionally, the new AMF 205b can send to the UE 201 the identity request message.

7th step: Conditionally, the UE 201 can send to the new AMF 205b the identity response message.

8th step: The new AMF 205b may decide to invoke an AUSF, i.e. an authentication server function.

9th step: The AUSF can initiate authentication of the UE 201 and NAS security functions.

10th step: Conditionally, the new AMF 205b sends to the old AMF 205a the information acknowledged message.

11th step: Conditionally, the new AMF 205b and the UE 201 exchange the identity request and response messages.

12th step: Optionally, the new AMF 205b initiates an ME identity check using an Equipment Identity Register (EIR).

13th step: If step 14 is to be performed, the new AMF 205b, based on the SUPI, selects a UDM.

14th step: If the AMF 205b has changed since the last registration, or if there is no valid subscription context for the UE 201 in the AMF 205b, or if the UE 201 provides a SUPI which does not refer to a valid context in the AMF 205b, the AMF 205b can initiate an update location procedure. This procedure includes that the UDM initiates cancel location to the old AMF 205a, if any. The old AMF 205a removes the MM context and notifies all possibly associated SMF(s), and the new AMF 205b creates an MM context for the UE 201 after getting the AMF related subscription data from the UDM.

15th step: Conditionally, the new AMF 205b, based on the SUPI, selects a PCF, i.e. a policy control function.

16th step: Optionally, the new AMF 205b sends to the PCF the UE context establishment request message. The new AMF 205b request the PCF to apply operator policies for the UE 201.

17th step: The PCF sends to the new AMF 205b the UE context establishment acknowledged message, i.e. the PCF acknowledges the UE context establishment request message.

18th step: Conditionally, the new AMF 205b sends to the SMF 207-3 the N11 request message. If the AMF is changed, the new AMF 205b notifies each SMF of the new AMF 205b serving the UE 201. The new AMF 205b can verify the PDU session status from the UE 201 with the available SMF information. In case the AMF has changed, the available SMF information can be received from the old AMF 205a. The new AMF 205b requests the SMF 207-3 to release any network resources related to PDU sessions that are not active in the UE 201.

19th step: The SMF 207-3 sends to the new AMF 205b the N11 response message. The SMF 207-3 may decide to trigger, e.g., a UPF relocation. If the registration type indicated by the UE 201 is a periodic registration update, then the following steps 20 and 21 may be omitted.

20th step: Conditionally, the old AMF 205a sends to the PCF the UE context termination request message. If the old AMF 205a previously requested the UE context to be established in the PCF, the old AMF 205a terminates the UE context in the PCF.

21st step: The PCF sends to the old AMF 205a the UE context termination acknowledged message.

22nd step: The new AMF 205b sends to the UE 201 the registration accept message, including, for instance, temporary user ID, registration area, mobility restrictions, PDU session status, NSSAI, periodic registration update timer. The new AMF 205b sends a registration accept message to the UE 201 indicating that the registration has been accepted. The temporary user ID can be included, if the new AMF 205b allocates a new temporary user ID. Mobility restrictions can be included in case mobility restrictions apply for the UE 201. The new AMF 205b can indicate the PDU session status to the UE 201. The UE 201 can remove any internal resources related to PDU sessions that are not marked active in the received PDU session status. If the PDU session status information is in the registration request, the new AMF 205b can indicate the PDU session status to the UE 201. The NSSAI can include the accepted S-NSSAIs.

23rd step: Conditionally, the UE 201 sends to the new AMF 205b the registration complete message. The UE 201 sends a registration complete message to the new AMF 205b to acknowledge if a new temporary user ID was assigned. The UE 201 is in the state "NSSAI-RM-Registered". This step allows the unambiguous indication which NSSAI the UE 201 is registered to. As a result the UE 201 is now registered to NSSAI_2 as well as NSSAI_1, to which the UE 201 was already registered at the time the "extra registration" was triggered.

24th step: Optionally, the new AMF 205b may send a registration notification message to other AMFs the UE 201 is registered to. Upon successful registration, the new AMF 205b receiving the registration complete message may send a registration notification message to AMFs of network slices the UE 201 is registered to.

Thus, in an embodiment, the user equipment 201 can comprise a communication interface configured to send a registration request message to the new AMF 205b, wherein the registration request message comprises an indication that the user equipment 201 is registered to the old AMF 205a (as illustrated in step 3 of FIG. 6). The indication can comprise a pre-defined value of a registration type parameter of the registration request message. In an embodiment, the registration request message can further comprise information about other AMFs the user equipment 201 is already registered to.

FIG. 7 shows a schematic diagram illustrating a method 700 for operating the user equipment 201 in the mobile communication network 200 according to an embodiment.

As already described above, the user equipment 201 is configured to use a plurality of communication services of the mobile communication network 200, wherein the plurality of communication services are provided by the plurality of network slices of the mobile communication network 200 and wherein access to the plurality of communication services provided by the plurality of network slices is controlled by the plurality of AMFs 205a-c, including the first AMF 205a and the second AMF 205b.

The method 700 comprises the step of registering 701 the user equipment 201 to the second AMF 205b for using one or more of the communication services provided by the one or more network slices associated with the second AMF 205b, while being registered to the first AMF 205a for using one or more of the communication services provided by the one or more network slices associated with the first AMF 205a.

FIG. 8 shows a schematic diagram illustrating a method 800 for operating a system providing a plurality of communication services of the mobile communication network 200 for the user equipment 201 according to an embodiment. The system comprises the plurality of AMFs 205a-c, including the first AMF 205a and the second AMF 205b. The plurality of communication services are provided by the plurality of network slices of the mobile communication network 200, wherein the access to the plurality of communication services provided by the plurality of network slices is controlled by the plurality of AMFs 205a-c.

The method 800 comprises the step of registering 801 the user equipment 201 to the second AMF 205b for using one or more of the communication services provided by the one or more network slices associated with the second AMF 205b, while the user equipment 201 is registered to the first AMF 205a for using one or more of the communication services provided by the one or more network slices associated with the first AMF 205a.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A user equipment configured to use a plurality of communication services of a mobile communication network, wherein the plurality of communication services are provided by a plurality of network slices of the mobile communication network and wherein access to the plurality of network slices is controlled by a plurality of access and mobility management functions, AMFs, including a first AMF and a second AMF, implemented in the mobile communication network, wherein the user equipment is configured to register to the second AMF for using one or more of the communication services provided by the one or more network slices associated with the second AMF, while being registered to the first AMF for using one or more of the communication services provided by the one or more network slices associated with the first AMF.

2. The user equipment of claim 1, wherein the user equipment comprises a processor being configured to be, with respect to each of the plurality of AMFs, in a first state or a second state, wherein in the first state of the processor the user equipment is registered to a respective AMF and in the second state of the processor the user equipment is de-registered to a respective AMF.

3. The user equipment of claim 2, wherein the user equipment is configured to identify the first AMF by a first identifier and the second AMF by a second identifier.

4. The user equipment of claim 3, wherein the first identifier comprises first network slice selection assistance information NSSAI_1 and the second identifier comprises second network slice selection assistance information NSSAI_2.

5. The user equipment of claim 4, wherein with respect to each of the plurality of AMFs, the first state is a "NSSAI_i-Registered" state and the second state is a "NSSAI_i-De-Registered" state, wherein NSSAI_i denotes the network slice selection assistance information for identifying the respective AMF.

6. The user equipment of claim 5, wherein for each of the plurality of AMFs the respective network slice selection assistance information NSSAI_i comprises one or more single network slice selection assistance information, S-NSSAI, parameters for identifying the one or more network slices associated with the respective AMF.

7. The user equipment of claim 1, wherein the user equipment further comprises a communication interface and wherein the communication interface is configured to send a registration request message to the second AMF, wherein the registration request message comprises an indication that the user equipment is registered to the first AMF.

8. The user equipment of claim 7, wherein the indication comprises a pre-defined value of a registration type parameter of the registration request message.

9. The user equipment of claim 7, wherein the registration request message further comprises information about AMFs the user equipment is registered to.

10. A method of operating a user equipment configured to use a plurality of communication services of a mobile communication network, wherein the plurality of communication services are provided by a plurality of network slices of the mobile communication network and wherein access to the plurality of network slices is controlled by a plurality of access and mobility management functions, AMFs, including a first AMF and a second AMF, implemented in the mobile communication network, wherein the method comprises the step of registering the user equipment to the second AMF for using one or more of the communication services provided by the one or more network slices associated with the second AMF, while being registered to the first AMF for using one or more of the communication services provided by the one or more network slices associated with the first AMF.

11. A system providing a plurality of communication services of a mobile communication network for a user equipment, wherein the system comprises a plurality of access and mobility management functions, AMFs, including a first AMF and a second AMF, implemented in the mobile communication network, wherein the plurality of communication services are provided by a plurality of network slices of the mobile communication network and wherein access to the plurality of network slices is controlled by the plurality of AMFs, wherein the second AMF is configured to register the user equipment to the second AMF for using one or more of the communication services provided by the one or more network slices associated with the second AMF, while the user equipment is registered to the first AMF for using one or more of the communication services provided by the one or more network slices associated with the first AMF.

12. The system of claim 11, wherein the second AMF is implemented on one or more network entities of the mobile communication network comprising a processor, wherein the processor is configured to be with respect to the user equipment and each of the plurality of AMFs in a first state or a second state, wherein in the first state of the processor the user equipment is registered to a respective AMF and in the second state of the processor the user equipment is de-registered to a respective AMF.

13. The system of claim 12, wherein the first AMF is configured to be identified by the user equipment using a first identifier and the second AMF is configured to be identified by the user equipment using a second identifier and wherein the first identifier comprises first network slice selection assistance information NSSAI_1 and the second identifier comprises second network slice selection assistance information NSSAI_2.

14. The system of claim 13, wherein with respect to the user equipment and each of the plurality of AMFs the first state is a "NSSAI_i-Registered" state and the second state is a "NSSAI_i-De-Registered" state, wherein NSSAI_i denotes the network slice selection assistance information for identifying the respective AMF.

15. The system of claim 14, wherein for each of the plurality of AMFs the respective network slice selection assistance information NSSAI_i comprises one or more single network slice selection assistance information, S-NSSAI, parameters for identifying the one or more network slices associated with the respective AMF.

16. The system of claim 11, wherein, in response to receiving a registration request message from the user equipment, the registration request message comprising information about the first AMF the user equipment (201) is registered to, the second AMF is configured to obtain identity information about the user equipment from the first AMF.

17. The system of claim 11, wherein, in response to receiving a registration request message from the user equipment, the registration request message comprising information about the first AMF the user equipment is registered to, the second AMF is configured to send a registration notification message to the first AMF for informing the first AMF that the user equipment is registered to the second AMF.

18. The system of claim 11, wherein the first AMF and the second AMF are implemented in a core network of the mobile communication network, wherein the first AMF is configured to be reached by the user equipment via a first radio access network of the mobile communication network and wherein the second AMF is configured to be reached by the user equipment via a second radio access network of the mobile communication network.

19. A method of operating a system providing a plurality of communication services of a mobile communication network for a user equipment, wherein the system comprises a plurality of access and mobility management functions, AMFs, including a first AMF and a second AMF, implemented in the mobile communication network, wherein the plurality of communication services are provided by a plurality of network slices of the mobile communication network and wherein access to the plurality of network slices is controlled by the plurality of AMFs, wherein the method comprises the step of registering the user equipment to the second AMF for using one or more of the communication services provided by the one or more network slices associated with the second AMF, while the user equipment is registered to the first AMF for using one or more of the communication services provided by the one or more network slices associated with the first AMF.

\* \* \* \* \*